Oct. 2, 1928.
C. A. ERICKSON
1,686,230
SPRING SUSPENSION
Filed Nov. 23, 1926
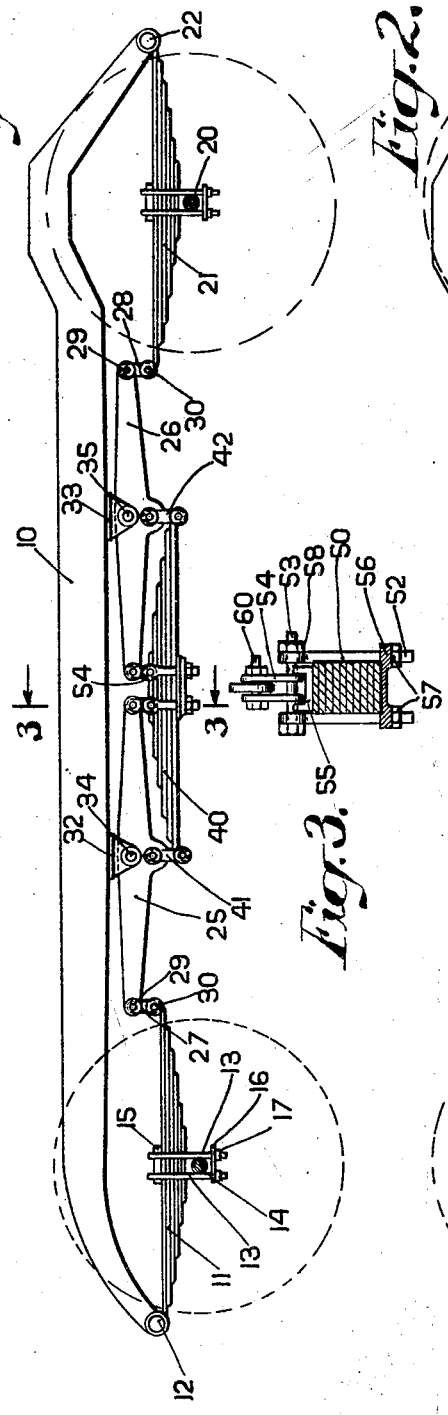
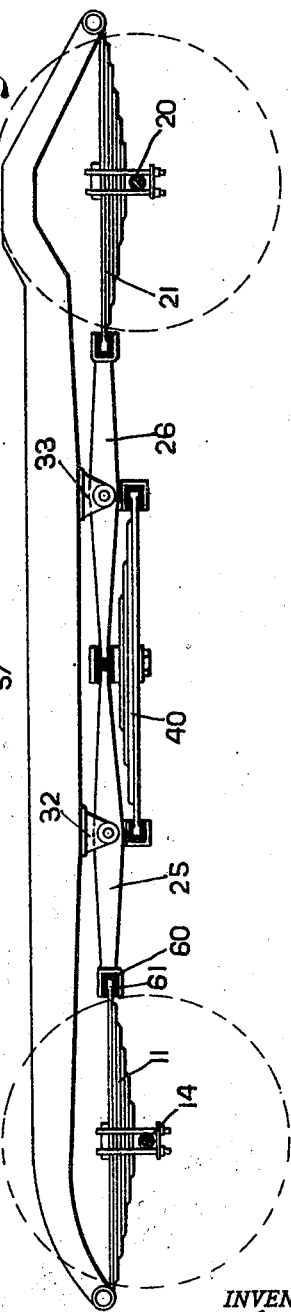
INVENTOR
Charles A. Erickson
BY
Albert N. Austin
ATTORNEY Patented Oct. 2, 1928.

1,686,230

UNITED STATES PATENT OFFICE.

CHARLES A. ERICKSON, OF CHICAGO, ILLINOIS.

SPRING SUSPENSION.

Application filed November 23, 1926. Serial No. 150,292.

This invention relates to springs, and more particularly to a spring suspension for vehicle chassis.

In a common type of spring suspension of the chassis of vehicles such as automobiles, both the front and rear axles of the vehicle are attached to the frame or the chassis through separate resilient members, one common form of such members being a semi-elliptic spring. When such a construction is employed the force of an impact which is applied to one of the wheels, for example the front wheel of a vehicle, is transmitted through the front spring to the front portion of the chassis, causing the same to rise or fall in accordance with the direction of the impact, the resiliency of the spring and the mass of the vehicle tending to produce a state of oscillation until the energy of the impact is dissipated.

In case the front and rear wheels are acted upon by different forces as is usually the case, the direction and period of oscillation of the two ends of the vehicle will be different causing a disagreeable pitching movement to take place, or in extreme cases, when the implied impacts are of such frequency as to cause synchronous vibrations of the vehicle, the extent of movement may be such as to cause damage to the springs or other portion of the chassis.

This invention relates to the type of spring suspension in which the above mentioned pitching movement of the vehicle is largely eliminated by applying the force of an impact substantially equally to both the front and the rear springs, causing the vehicle to assume a horizontal movement, and eliminating the tendency of the same to pitch.

This is accomplished in accordance with the present invention by providing a connecting link mechanism between the front and rear springs of the vehicle, said link mechanism being resiliently supported and adapted to cause movement of both the front and rear springs in the same direction.

Although the novel features which are believed to be characteristic of this invention will be pointed out with particularity in the claim appended hereto, the invention itself, as to its objects and advantages, the mode of its operation and the manner of its organization may be better understood by referring to the following description taken in connection with the accompanying drawings forming a part thereof, in which Fig. 1 is an elevation of a portion of a vehicle chassis including the spring members constructed in accordance with this invention;

Fig. 2 is an elevation of a modification thereof; and

Fig. 3 is a section taken on the line 3—3 of Fig. 1 showing certain details of the link mechanism.

In the following description and in the claim parts will be identified by specific names for convenience, but they are intended to be as generic in their application to similar parts as the art will permit.

Referring to the drawings more in detail the spring suspension constructed in accordance with this invention is shown as applied to frame member 10 which may be a portion of a vehicle chassis. Spring member 11 which may be of a semi-elliptic type is attached pivotally to the front of frame 10 by means of bolt 12 passing through the front end of the frame, the upper leaf of spring 11 being suitably rolled to engage said bolt. The particular manner of attachment of the spring to the frame, however, forms no part of the present invention. Consequently any well known manner of pivotally connecting the spring member to a stationary support may be employed if desired.

The front axle of the vehicle may be attached to the center portion of spring 11 by any well known means such as U-bolts 13 surrounding the spring and serving to clamp the axle 14 thereto. A bearing plate 15 may be interposed between U-bolts 13 and spring 11 to distribute the stress more equally over the spring leaves. Plate 16 may be included below the axle and provided with holes through which the ends of U-bolts 13 may be inserted. The axle may then be tightly clamped to spring 11 by nuts 17 which are threaded upon the end of U-bolt 13, said nuts being tightened to tension the bolt and thereby rigidly clamp the axle and spring between bearing plate 15 and plate 16.

Rear axle 20 of the vehicle may be clamped to spring member 21 in a similar manner, the rear portion of spring 21 being pivotally connected to the rear end of frame 11 by means of bolt 22, the upper leaf of spring 21 being suitably formed to receive said bolt in a well known manner.

The rear end of spring 11 and front end of spring 21 are supported by means of levers 25 and 26 respectively through suitable connecting links 27 and 28. These links may comprise a pair of connecting members disposed on opposite sides of the lever and spring and pivotally connected thereto by means of bolts 29 and 30. This particular link mechanism is, however, shown by way of illustration only, in order to provide a complete disclosure of the invention and is not intended as a limitation thereon.

Levers 25 and 26 may be attached to frame 10 by means of angle irons 32 and 33, said levers and angle irons being drilled to receive bolts 34 and 35 respectively. Bolts 34 and 35 provide pivotal connecting means and allow levers 25 and 26 to rotate thereabout for a purpose to be hereinafter set forth.

An auxiliary spring member 40 is connected to frame 10 in any suitable manner such as by links 41 and 42 which may be pivotally connected to both the ends of spring 40 and to the central portion of levers 25 and 26 respectively. The above links provide a means for connecting spring 40 to the vehicle frame since the movement of the central portion of levers 25 and 26 is comparatively small. The spring may, however, be directly connected to frame 10 if desired.

The free end of levers 25 and 26 may be pivotally connected to the central portion of spring 40 through suitable connecting links, one manner of such connection as illustrated herein comprises a pair of bolts 50 provided with an eye 51 at one end and a threaded portion 52 at the other end. Bolt 53 may be inserted through the eye portion of bolts 50 and also through a suitable hole in links 54. A U-shaped bearing plate 55 may be inserted at the top of spring 40 for supporting bolt 53 and allowing clearance for free movement of link 54 thereabout. The threaded ends of bolt 50 may then be inserted through plates 56 and the assembly secured in compact relationship by nuts 57. Bolt 53 may be provided with threaded ends and nuts 58 applied thereto to prevent the bolt from becoming disengaged during service.

The upper end of links 54 may be pivotally connected to levers 25 or 26 by means of bolts 60 which may be inserted through aligned openings in the upper portion of said links and in the lever to which it is applied.

The construction described above provides for the necessary transverse movement of the various parts as the spring members are deflected and the levers rotated about their pivots. Should an impact be applied to one of the wheels of the vehicle, for example the front wheel, in such a direction as to cause spring 11 to be compressed, the rear end of that spring will tend to move in an upward direction. The end of lever 25 connected thereto will also be urged in an upward direction causing the lever to tend to rotate about bolt 37 as a pivot in a clockwise direction. This rotation will be opposed by the resiliency of spring 40 and the amount thereof limited in accordance with the characteristics of the spring.

The spring 40 is preferably designed to have such characteristics as will allow a certain amount of movement of the various levers in response to the usual shocks received in driving a vehicle over an uneven road.

The movement which takes place in the example which has been chosen will cause the rear end of lever 25 to move downwardly and compress spring 40. The front end of spring 26 which is attached thereto will undergo a similar movement causing the rear end thereof and link 28 to be raised a distance corresponding to that to which link 27 was raised by the impact. The upward movement of link 28 will cause an upward movement of the rear spring 21, raising rear axle 20 an amount equal to that which front axle 14 has been raised. This results in maintaining frame 10 in a horizontal position, the force of the impact being dissipated through each of the springs in the complete system, and a corresponding movement taking place at each end of the vehicle.

A modified arrangement of the spring suspension is disclosed in Fig. 2 in which the various connecting links are replaced by rubber compression members. Spring 11 is connected to lever 25 by a compression member comprising a portion of resilient rubber 60 suitably contained in an enlarged portion 61 of member 25. The end of spring 11 is secured to and supported by this rubber member, being capable of a limited movement therein. A similar construction is employed for the various other links shown in Fig. 1 for attaching spring 21 to lever 26; for attaching spring 40 to levers 25 and 26; for attaching the ends of levers 25 and 26 to the center portion of spring 40.

The various other features disclosed in Fig. 2 are similar to those in Fig. 1, the spring assembly operating in the same manner.

By means of the above described spring assembly the tendency of the vehicle to pitch in response to rapid shocks which are transmitted unevenly to the two axles is largely eliminated. Any movement of one axle is transmitted through the connecting link mechanism to produce the corresponding movement of the other axle. The only movement which may take place in a vehicle so constructed is a parallel horizontal motion, the movement of the front and rear portions being equal and in the same direction.

Although the novel features of the invention have been shown and described and have been pointed out in the annexed claim, it will be understood that various omissions, substitutions and changes in the forms and details of the device illustrated and in its operation may be made by those skilled in the art without departing from the spirit of the invention.

What is claimed is:

A vehicle chassis, a pair of semi-elliptic springs, means for connecting one end of said springs to said chassis, a lever for supporting the other end of each of said springs, said levers being pivotally connected to said chassis, means for interconnecting the free ends of said levers, and means for resiliently limiting the extent of movement thereof, said assembly being so arranged that movement of one of said springs is transmitted through said levers to produce similar movement of the other of said springs.

In testimony whereof I have hereunto set my hand.

CHARLES A. ERICKSON.